US006939014B1

(12) United States Patent
Vance et al.

(10) Patent No.: US 6,939,014 B1
(45) Date of Patent: Sep. 6, 2005

(54) LIQUID TRANSMISSIVE FILTER HAVING ANISOTROPIC PROPERTIES AND METHOD OF FABRICATION

(75) Inventors: Dennis W. Vance, Paso Robles, CA (US); Charles Robert Wolfe, Palo Alto, CA (US)

(73) Assignee: Jenmar Visual Systems, Inc., Fremont, CA (US)

( * ) Notice: Subject to any disclaimer, the term of this patent is extended or adjusted under 35 U.S.C. 154(b) by 0 days.

(21) Appl. No.: 10/039,622

(22) Filed: Dec. 31, 2001

(51) Int. Cl.[7] ................................................ G02B 27/00
(52) U.S. Cl. ........................ 359/613; 359/614; 359/454
(58) Field of Search ................................ 359/614, 452, 359/453, 613, 454, 455, 456, 457, 443

(56) References Cited

U.S. PATENT DOCUMENTS

| | | | | |
|---|---|---|---|---|
| 2,378,252 A | * | 6/1945 | Staehle et al. | 359/453 |
| 5,563,738 A | * | 10/1996 | Vance | 359/614 |
| 5,781,344 A | * | 7/1998 | Vance | 359/614 |
| 5,932,342 A | * | 8/1999 | Zeira et al. | 428/327 |
| 6,076,933 A | * | 6/2000 | DiLoreto et al. | 359/614 |
| 6,310,722 B1 | * | 10/2001 | Baek | 359/455 |
| 6,417,966 B1 | * | 7/2002 | Moshrefzadeh et al. | 359/453 |
| 6,468,378 B1 | | 10/2002 | Hannington | |
| 6,600,599 B2 | | 7/2003 | Hannington | |
| 6,695,453 B2 | | 2/2004 | Hannington | |

FOREIGN PATENT DOCUMENTS

| | | | | |
|---|---|---|---|---|
| JP | 03-002855 | | 1/1991 | |
| JP | 03002855 | * | 1/1991 | 359/457 |
| JP | 05-216121 | | 8/1993 | |
| JP | 05216121 | * | 8/1993 | 359/443 |

* cited by examiner

*Primary Examiner*—Drew A. Dunn
*Assistant Examiner*—Joshua L Pritchett
(74) *Attorney, Agent, or Firm*—Fenwick & West LLP

(57) ABSTRACT

An optical filter includes an array of light-transmissive beads in a matrix of light absorbing binder that surrounds one portion of the beads to provide light entrances and exit apertures for incident light to pass substantially only through the beads. A transparent layer under the light absorbing layer may serve to increase the diameter of the exit apertures. A structure or layer of light-dispersing material that exhibits anisotropic dispersion of incident light along orthogonal axes is disposed relative to the beads to disperse light within a wider output angle along one of the orthogonal axes than along another of the orthogonal axes.

7 Claims, 4 Drawing Sheets

LIQUID TRANSMISSIVE FILTER HAVING ANISOTROPIC PROPERTIES AND METHOD OF FABRICATION

FIELD OF THE INVENTION

This invention relates to the field of light filters, and more particularly to light filters that exhibit asymmetrical dispersion of light perpendicular to direction of propagation.

BACKGROUND OF THE INVENTION

Rear projection screens and light diffusers include light filters which provide an optically dispersing medium for transmitting light from an image source on one side of the screen to a viewer on the opposite side of the screen. A basic refractive light filter has been described in U.S. Pat. No. 2,378,252, which includes a refracting lens system as its principal component. The refracting lens system comprises an array of spherical transparent beads embedded in an opaque binder layer and mounted on a transparent support material. Certain known light filters orient the bead layer toward the image source and the transparent support material toward the viewers. (See, for example, U.S. Pat. No. 5,563,738).

The opaque binder layer affixes the beads to the support material, reduces the reflectivity of the filter, and reduces the amount of light transmitted through the interstices between the beads of the lens system. Light from an image is refracted by the beads and dispersed to the viewer through a transmission area of the beads. This transmission area includes an aperture about the point of contact between the bead and support material and the area surrounding this point where the opaque binder layer is too thin to absorb the refracted light.

Rear projection screens and light diffusers are characterized by their ambient light rejection, resolution, gain, and contrast as properties which are determined by the structure and composition of the component materials. For example, the gain which is a measure of the intensity of transmitted light as a function of the viewing angle, is determined primarily by the index of refraction of the spherical beads and the surrounding medium. Similarly, the ambient light rejection and contrast of the light filter are determined largely by the optical absorption of the binder layer. The resolution of the screen is determined by the size of the beads used and how they pack together in the lens system.

However, the interdependence of certain optical properties and their dependence on the properties of component materials, limit optimization of the optical properties of basic refractive light filters. For example, if the optical absorption of the binder layer is increased to enhance the ambient light rejection of the viewing surface, transmission of refracted image light through the binder layer in the transmission area of the bead will be reduced. In addition, the range of indices of refraction of available materials also limits the performance of such filters. Such interdependencies and material limitations hamper the performance of basic refractive filters.

SUMMARY OF THE INVENTION

A multi-layer light filter in accordance with the present invention includes a single layer of glass or resin beads supported in an opaque layer and an additional contiguous light-dispersing support or backing layer that exhibits asymmetrical or anisotropic light-dispersing properties along axes perpendicular to the direction of propagation. "Anisotropic" and "asymmetrical" are used interchangeably to have the same meaning for purposes of this disclosure. This structure of optical components enhances the dispersion or scattering of light along one axis, for example the horizontal axis, and without changing the dispersion or scattering of light along an orthogonal axis, for example, the vertical axis. Such a structure promotes wider viewing angles as viewed along one (i.e., the horizontal) axis from the light output side of the support layer. Such structure also leaves unchanged viewing angles, as viewed along the other (i.e., vertical) axis from the light output side of the support layer.

In accordance with another embodiment of the present invention, the gain of the structure that may be altered by the addition of a layer of transparent resin on the incident light side of the structure to cover all or part of the portion of the beads protruding from the opaque layer in substantial surface conformity with the contour of the protruding beads.

The transparent resin layer provides additional gain control by increasing the incident area of light transmitted through a bead and by replacing the air/bead interface with air/resin and resin/bead interfaces at which both the refraction and reflection of image light can be separately adjusted. Selecting the relative indices of refraction, contour, and the thickness of the transparent resin forming the conformal layer as well as the index of refraction of the beads controls refraction and reflection at the resin/bead interface. A thin layer of transparent resin is effective to alter the shape of the protruding surfaces of the beads. Also, a thin transparent layer may be disposed between the contact points of the beads with the support layer and the opaque binder layer to alter the exit apertures of the beads for enhancing transmission therethrough of refracted light.

Additionally, the support layer may exhibit asymmetric dispersion of light by different amounts and angles in one orientation than in an orthogonal orientation. This facilitates expansion of the viewing angle, for example, along the horizontal axis compared with narrower viewing angle along the vertical axis. Such support layer may form the support or backing layer contiguous the single layer of beads, or may supplement a transparent support layer in a more rigid structure to provide substantially the same asymmetrical scattering oflight passing through the light filter assembly.

DETAILED DESCRIPTION OF THE INVENTION

Figure 1:
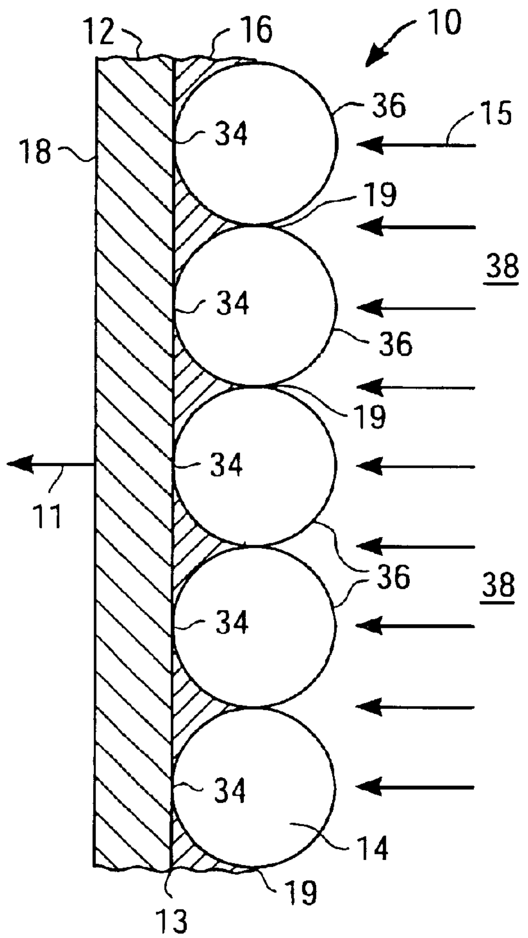
FIG. 1 is a sectional view diagram of one embodiment of the present invention, illustrating the direction of light propagation.

Referring now to FIG. 1, there is shown a sectional view of a segment of a light filter 10 according to one embodiment of the present invention. A support layer 12 having asymmetric light dispersing properties, as more fully described later herein, contacts a plurality of spherical glass or resin transparent beads 14 that are oriented substantially in contiguous array one layer deep on the support layer 12. The interstices between beads 14 and the support layer 12 are filled with an opaque binder 16 which binds the beads 14 to the support layer 12 and inhibits the passage of incident light 15 through the filter otherwise than through the front center of the beads 14.

Light 38 that is approximately collimated from an effectively distant image source (not shown) is incident on filter 10 at back surfaces 36 of beads 14 and back surface 19 of opaque binder layer 16 between the beads. These surfaces define an incident or image side of light filter 10. Outer surface 18 of the support layer 12 defines a front or viewing side of light filter 10 through which viewers observer the transmitted image light. Thus, light incident on beads 14 is refracted, transmitted through the beads 14 and the associated transmission apertures 34, and is asymmetrically dispersed to viewers through the support layer 12. Light 38 incident on the back surface 19 of the opaque binder layer 16 between beads 14 is absorbed to reduce transmission of this light through the filter assembly 10. Therefore. "opaque binder layer." "optical absorption binder layer," "light absorbing binder layer." "absorbing binder," and "absorbing layer" are used interchangeably to refer to layer 16 in this disclosure.

Figure 2:
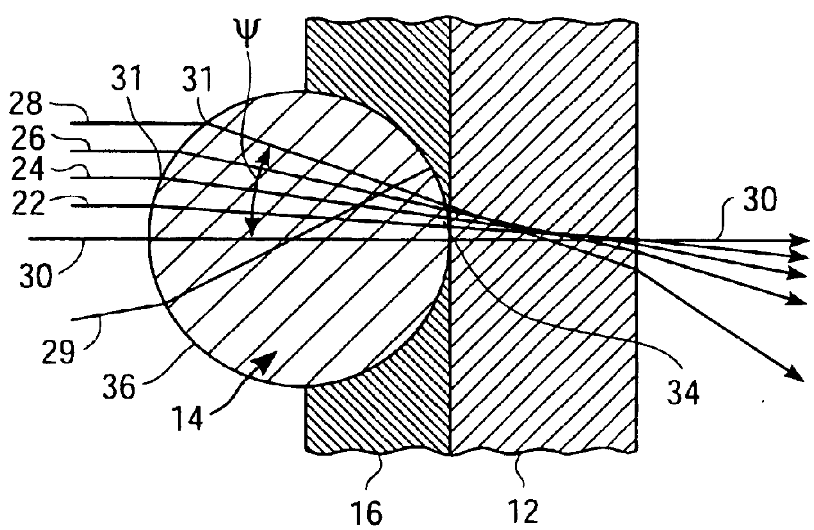
FIG. 2 is a sectional view illustrating the refraction of light rays by spherical beads in the embodiment of FIG. 1.

Referring now to FIG. 2, there is shown a diagram of the paths followed by refracted light rays 22, 24, 26, 28 incident on back surface 36 of bead 14 at various distances from optic axis 30. Substantially collimated light rays 22, 24, 26, 28 are refracted toward optic axis 30 by an angle Ψ that increases with the distance between a point of incidence 31 and optic axis 30. Angle Ψ also increases with the index of refraction of beads 14. Refracted light rays 22, 24, 26, 28 are directed through transmission aperture 34, which includes the point of contact between bead 14 and support layer 12 as well as the surrounding area where intervening opaque binder layer 16 is too thin to absorb refracted light rays 22, 24, 26, 28. In contrast, non-collimated ray 29 tends to be refracted to outside of a transmission aperture 34 and is absorbed by the opaque binder layer 16.

Refracted rays 22, 24, 26, 28 diverge after passing through the transmission aperture 34 of bead 14 and disperse through the support layer 12 over a larger range of horizontal viewing angles and a narrower range of vertical viewing angles. The collective action of beads 14 and support layer 12 in dispersing transmitted light intensity at various horizontal and vertical viewing angles relative to a normal axis 11 of filter output surface 18 results in the gain profile of the filter. High gain light filters generally transmit image light in a narrow angular distribution about a normal viewing axis, whereas low gain filters generally transmit image light in broad distributions about the normal viewing axis. The optimum gain for such light filters depends upon its intended use, and is selected in part by choosing the optical material for beads 14 having an appropriate index of refraction, as later discussed herein.

Figure 4:
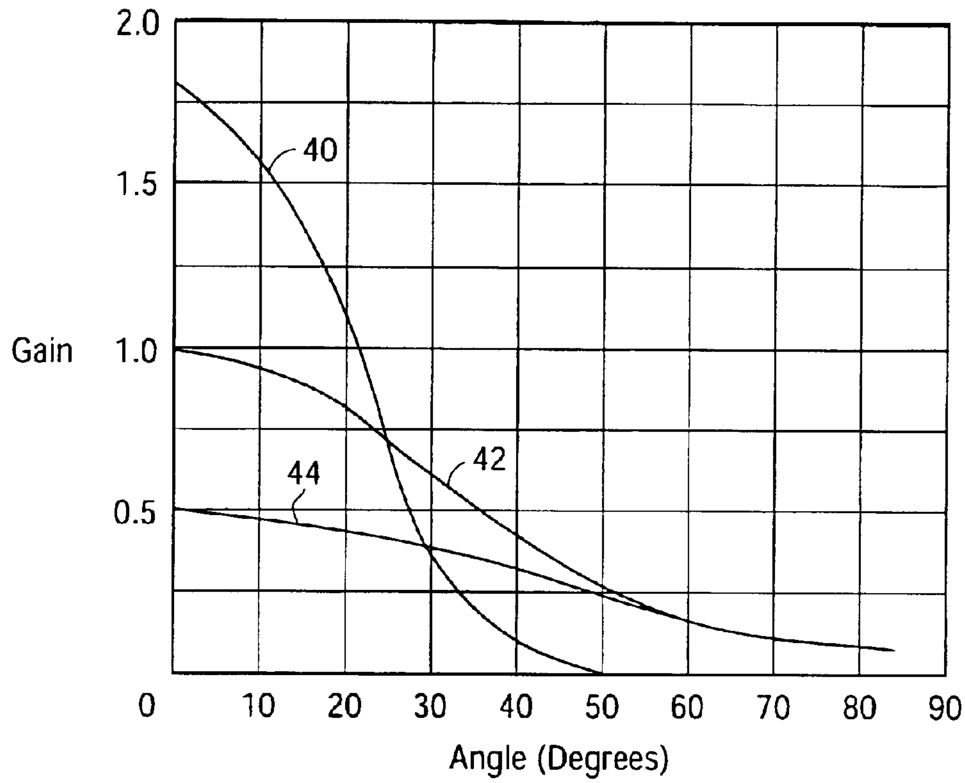
FIG. 4 is a graph illustrating typical screen gain associated with a conventional beaded light filter as a function of index of refraction of the bead material.

Referring to the graph of FIG. 4, there are plotted gain profiles 40, 42, 44 for basic refractive light filters 10 comprising beads 14 having indices of refraction of 1.5, 1.7, and 1.9, respectively. The gain at 0° with respect to normal 11 is greatest for low index beads 14 and decreases with increasing index of refraction. The greater refractive power of high index beads 14 refracts transmitted rays 22, 24, 26, 28 more significantly than low index materials, and such rays subsequently diverge over a wider range of horizontal or vertical viewing angles from the normal axis 11 and are less focused along the normal axis 11.

In addition to gain, light filters 10 are characterized by their resolution, contrast, and ambient light rejection. For these filters, it is generally desirable to have both high resolution and high ambient light rejection. The resolution of light filter 10 is determined by the size of beads 14, since the packing density of beads 14 on support layer 12 determines the density of transmission apertures 34 on this surface. This property can generally be maximized by constructing filters 10 using the smallest diameter beads 14 available, typically of approximately 25–100 microns in diameter. The minimum practical size of beads 14 selected may be dictated by variations in the quality and properties of available beads 14.

Ambient light rejection measures how well ambient light incident on the viewing surface of a light filter is absorbed or transmitted relative to the amount redispersed back toward the viewer. This property depends primarily on the reflectivity of the front surface of the support layer 18, the optical absorption of binder layer 16 and the index of refraction of beads 14. Ambient light reflected into viewers' eyes from filter 10 can significantly impair the quality of an image by reducing the contrast.

In the filter assembly 10 illustrated in FIG. 1, ambient light incident on the viewing surface 18 may be reflected at the interfaces between: a) the opaque binder layer 16 and support layer 12; b) the beads 14 and opaque binder layer 16; and c) beads 14 and air at incident surface 36. Of these, the air-bead interface may be most significant because the indices of refraction of support layer 12, opaque binder layer 16, and beads 14 can be made more nearly equal to minimize reflections from the first two interfaces. Ambient light rejection in the filter 10 of FIG. 1 is affected by optical absorption of binder layer 16. However, increasing the optical absorption of binder layer 16 to improve ambient light rejection decreases the amount of image light transmitted through the transmission apertures 34 around the point of contact between beads 14 and support layer 12.

Figure 3:
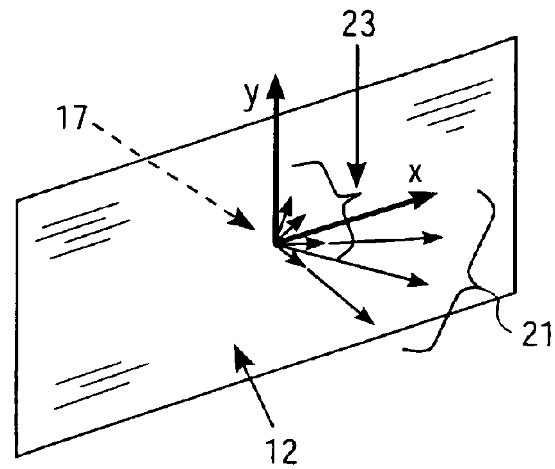
FIG. 3 is a pictorial diagram illustrating asymmetrical light dispersion through the support layer in the embodiment of FIG. 1.

Referring now to FIG. 3, there is shown a pictorial diagram of the light dispersing properties of the support layer 12. This layer 12 is typically formed of polymer material that is commercially available in sheets a few mils thick and promotes asymmetrical dispersion of incident light along orthogonal axes. Other forms and types of asymmetric dispersing layers may be used that include holographic dispersing films, micro formed lenticular arrays abraded films and similar materials. The incident light 17 may be approximately collimated and may enter the layer 12 approximately normal to an incident surface of the layer. Such incident light is dispersed predominantly along one axis 21, for example, along the horizontal axis, and significantly more weakly along an orthogonal (e.g. vertical) axis 23.

Figure 5:
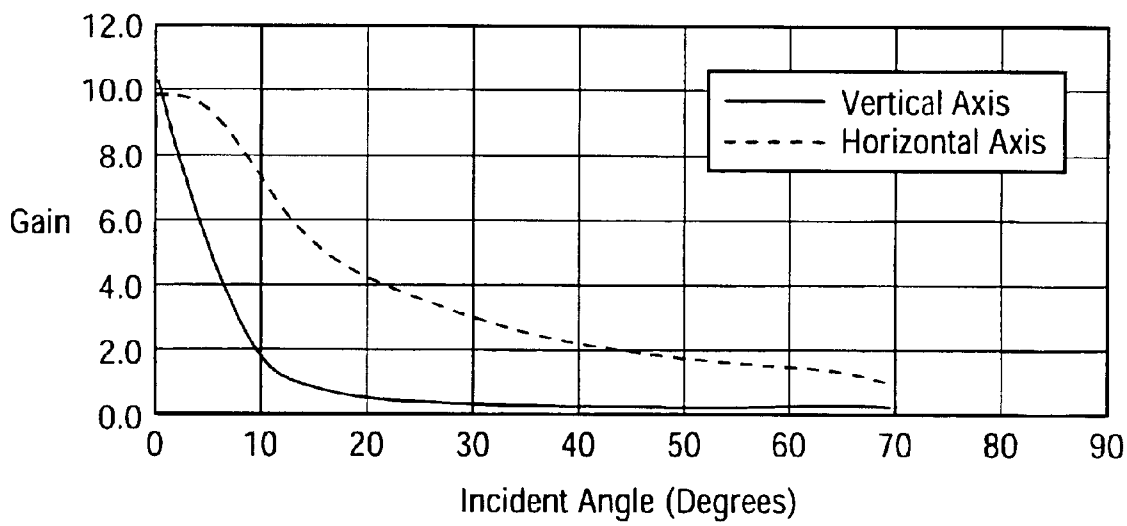
FIG. 5 is a graph illustrating the intensity of asymmetric dispersion of light through the support layer in the embodiment of FIG. 1.

Referring now to the graph of FIG. 5, the asymmetrical or anisotropic optical properties of the support layer 12 are illustrated as being significantly different along different axes in that transmitted light is dispersed along the vertical axis from an initial gain of about 10 (for normal incident illumination and on-axis viewing) to half-gain level at about 7° off-axis viewing. In contrast, the transmitted light is dispersed along the horizontal axis to half-gain level at about 18° off axis viewing.

Figure 6:
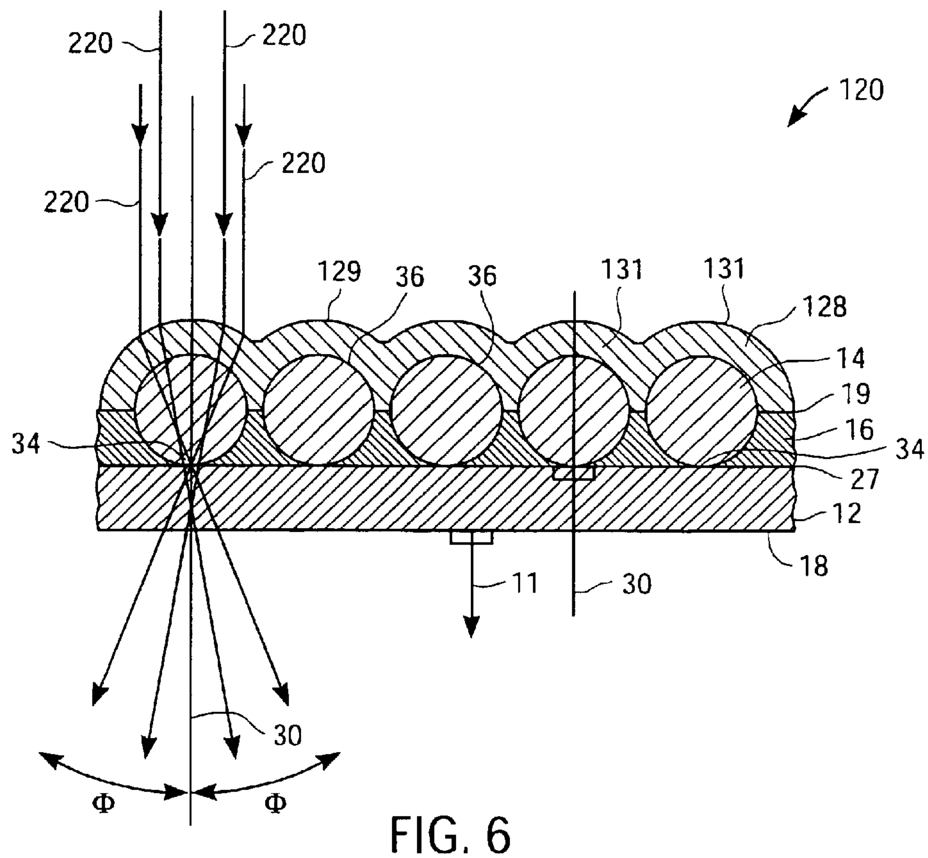
FIG. 6 is a sectional view of another embodiment of light filter in accordance with the present invention.

Referring now to FIG. 6, there is shown another embodiment of a light filter 120 of the present invention comprising a single-layer array of light transmissive beads 14 structurally supported in an absorbing binder layer 16 having a surface 19 through which the beads 14 protrude to receive substantially collimated light 220 from an image source (not shown), and having a substantially flat interface surface 27 at which the beads 14 contact the support layer 12 of anisotropic dispersing properties. This allows transmission of the light 220 through a plurality of transmission apertures 34 and through the support layer 12 for viewing within different horizontal and vertical viewing angles. The beads 14 each have a radius about equal to a selected value R. The light filter 120 includes the transparent support layer 12 affixed to the surface 27 of the absorbing binder layer 16, with the filter surface 18 oriented toward the viewer (not shown). The light filter 120 also includes an additional conformal layer of light transmissive material 128 disposed over the protruding beads 14 to a substantially uniform thickness between about 0.1 R and 1.0 R, where such thickness is measured normal to the spherical surfaces 36 of the beads 14. This conformal layer 128 can also cover the surface 19 of an opaque binder layer 16 between substantially contiguous beads 14.

The conformal layer 128 defines a plurality of lenses 131 for controlling dispersion of incident light and increasing the transmittance of the light filter 120. Each such lens 131 is disposed on the protruding surface 36 of a bead 14 and has a substantially spherical or curved incident surface 129 with a radius of curvature about 1.1 to 2 times the radius of the bead 14 or an average thickness around the beads of about 0.1 to 1 times the radius of the beads 14.

The conformal layer 128 presents increased incident surface to incoming light 220 and functions as a preliminary stage of convergent refraction of light 220 from the image source (not shown) into the beads 14. This allows a greater portion of incident light to enter into the beads 14, and such light 220 so converged is incident on the protruding surfaces 36 of the beads 14 above the absorbing layer 16 at angles that allow a greater percentage of the light 220 to enter the beads 14 and propagate into the transmission apertures 34 of the beads 14. Light emanating from the transmission apertures 34 is then asymmetrically or anisotropically dispersed by the support layer 12 for viewing through different horizontal and vertical viewing angles relative to the axis 11 that is normal to the viewing surface 18. Thus, a greater percentage of the light 220 striking the back surfaces 36 of the beads 14 is transmitted through the filter surface 18 than is typically feasible with conventional single-layer light filters, which have a typical transmittance of about 35 percent.

The conformal layer 128 also reduces the index of refraction mis-match ($n_{beads}/n_{medium}$) at the rear surface of the screen. Reducing this index mis-match reduces reflection of the light 220 off the surfaces 36 of the beads 14, and increases the transmittance of the light filter 120. Typical index of refraction of the bead material is about 1.4 to 1.9.

The gain of light filter 120 can further be controlled by the degree of curvature of the incident surface 129 of the conformal layer 128. These properties of the present invention beneficially prevent excessive loss of image light intensity caused by reflection, as in conventional single-layer light filters. Adjustment of the dispersion of light through various angles Φ relative to the axis 11 that is normal to the viewing surface 18 of the support layer 12 in light filter 120 can also be achieved by appropriately selecting the index of refraction of the light-transmissive material of the conformal layer 128. Heat and pressure can be applied to selectively shape the incident surface 129 of the conformal layer 128 for improved operation of the light filter 120. For example, the transmittance of the light filter 120 can be increased by reducing the radius of curvature of the incident surface 129 of this layer 128, as illustrated and described in greater detail later herein with reference to FIG. 8.

Figure 7:
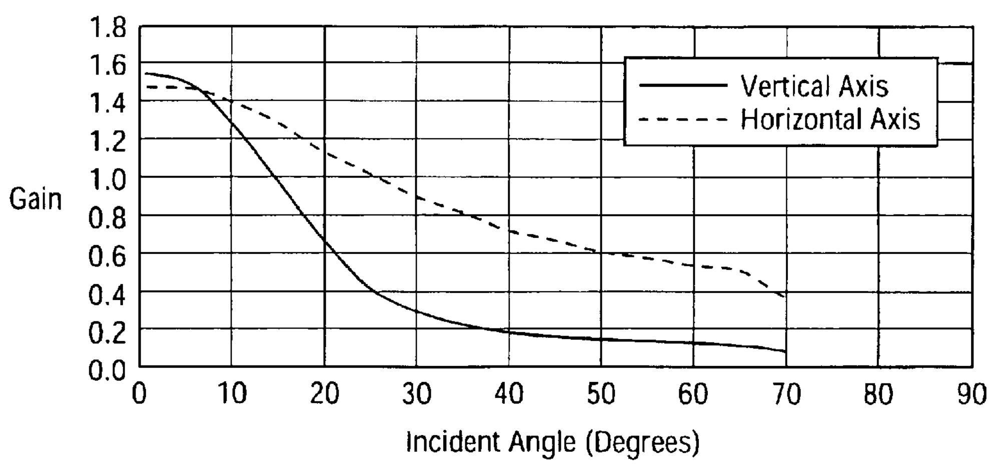
FIG. 7 is a graph illustrating asymmetric light diffusion through the embodiment of a light filter illustrated in FIG. 6.

Referring to the graph of FIG. 7, the optical characteristics of the light filter illustrated in FIG. 6 show significant asymmetrical gains in vertical and horizontal orientations. Specifically, initial gain (for normal incident illumination and on-axis viewing) diminishes significantly with viewing angle from on-axis orientation along the vertical axis, but diminishes less significantly with viewing angle from on-axis orientation along the horizontal axis. In one embodiment of the light filter of FIG. 6, the gain diminishes to one-half of the initial level at approximately 18° off axis viewing along the vertical axis, and diminishes to one half of the initial gain at approximately 38° off axis viewing along the horizontal axis with the asymmetry of the viewing angles maximized at about 36°.

Figure 8:
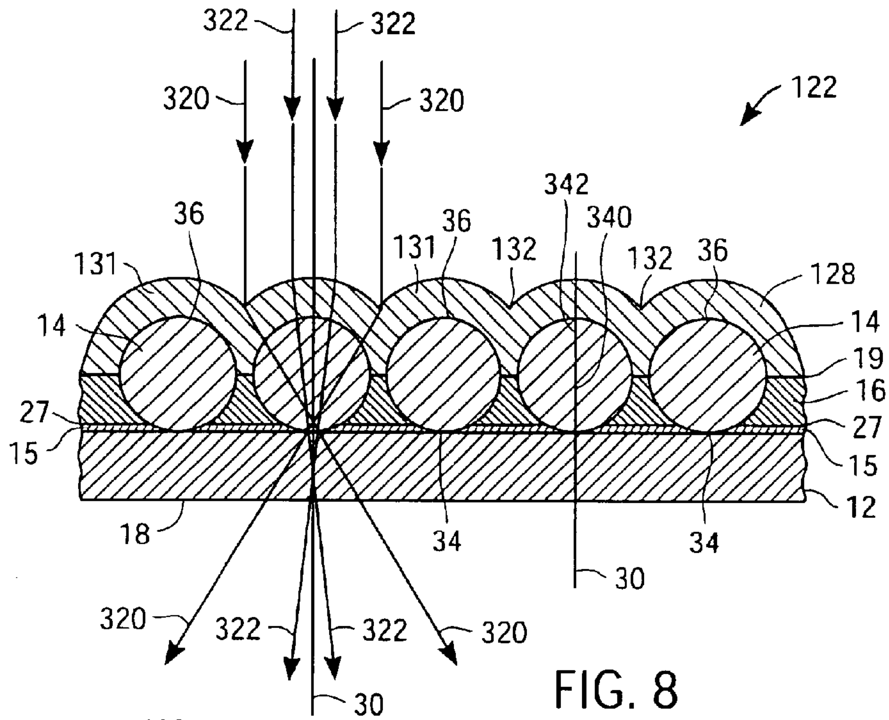
FIG. 8 is a sectional view of another embodiment of the light filter including an intermediate transparent layer for enhanced light transmission through the filter.

Referring now to FIG. 8, there is shown another embodiment of a light filter 122 according to the present invention in which an array of light transmissive beads 14 one layer thick are substantially contiguously supported in an opaque binder layer 16 having an incident surface 19 through which the beads 14 protrude to receive substantially collimated light 320, 322 from an image source (not shown), and having a substantially flat front surface 27 through which the beads 14 protrude. Large transmission apertures 34 allow transmission of the light 320, 322 therethrough that is anisotropically diffused along horizontal and vertical viewing axes by the support layer 12. This embodiment of light filter 122 according to the present invention includes a thin layer 15 of transparent material to a thickness of about 10% of the radius R of the beads to facilitate formation of larger transmission apertures 34 than can be achieved through point contact alone of the beads 14 with the support layer 12. The thickness of the transparent layer 15 (typically, to not greater than R) control the sizes of the transmission apertures 34 and therefore the gain of the filter. The index of refraction of the material forming transparent layer 15 may be generally equal to or less than the refractive index of the beads for reducing the reflectance of the entire assembly by graded index changes.

The light filter 122 also includes a conformal layer 128 of light transmissive material disposed on the incident surfaces 36 of the beads 14 and surface 19 of an absorbing binder layer 16. The additional conformal layer 128 defines a substantially spherical or parabolic lens 131 behind each bead 14, with local points or centers of curvature 342 disposed forward in the direction toward the source of incident light relative to the centers of curvature 340 of the beads 14. The layer 128 thus has a non-uniform thickness as measured normally to the spherical protruding surfaces 36 of the beads 14.

The conformal layer 128 provides a preliminary stage of convergent refraction of the incident light 320, 322 into the beads 14. Further, it is believed that displacing the centers of curvature 342 or the focal points of the incident surface 129 of layer 128 in the direction toward the source of incident light relative to the centers of curvature 340 of the beads 14 increases convergence of such light 320, 322 into the beads 14, and converges such light into the beads 14 nearer to the ideal angles for refraction of such light 320, 322 through the transmission apertures 34. This filter assembly exhibits transmittance of up to about 60 percent.

The support layer 12 diffuses light emanating through transmission apertures 34 through different vertical and horizontal viewing angles relative to axis 30 normal to the viewing surface 18, as previously described with reference to FIG. 3. Alternatively, the support layer 12 may comprise a thin film of such anisotropical dispersing material, as previously described with reference to FIG. 3, disposed on a thick layer of transparent material (on either side) to form a composite support layer for improved sturdiness of the light filter 120. The support layer 12 is affixed to the thin transparent layer 15 which, in turn, is affixed to the surface 27 of the absorbing binder layer 16, with the viewing surface 18 oriented toward the viewer (not shown).

The index of refraction of the beads 14 is preferably selected to be from 1× to 1.3×index of refraction of the conformal layer 128 for increasing transmission of image light into the beads 14. Suitable materials for the conformal layer 128 include polymethylmethacrylate and thermoplastic polyurethane (TPU), and similar clear thermoplastic materials. For example, a conformal layer 128 with an index of refraction of about 1.5 can be fabricated for either of these two materials, and the beads 14 can be fabricated from glass or resinous material selected with an index of refraction in a range between about 1.5 and 1.94. The conformal layer 128 beneficially reduces the difference, or mis-match in indices of refraction encountered by light 320, 322 at the interface with the incident surface 36 of the beads 14. This increases the transmittance of the filter. Gain control can also be provided, by controlling the thickness and/or selectively shaping the incident surface 129 of the conformal layer 128 in the manner described above. In an alternative embodiment of the present invention, a layer of anisotropic or asymmetrical light diffusing material of the type previously described herein with reference to layer 12 may be use to asymmetrically disperse the incident light over a greater angle along the horizontal axis than along the vertical axis.

One process of the present invention for making light filter 122 of the embodiment illustrated in FIG. 8 uses an absorbing binder such as thermoplastic resin uniformly mixed with a colorant such as carbon black, a plurality of light transmissive beads 14 each of radius R, and a thin layer 15 of transparent material having a uniform thickness selected between about 0.1 R and 0.5 R, and a support layer 12 of anisotropically diffusing film 12. The absorbing binder is selected to have a viscous unset state and substantially rigid set state, and the thin transparent material in layer 15 is selected to have a deformable semi-viscous unset state and substantially rigid set state. The process includes depositing a layer of the absorbing binder in the unset state on the thin transparent layer 15 which is disposed on the incident surface of the asymmetrical diffusing support layer to a total thickness above the support layer 12 that is about 0.3 to 0.8 R. The plurality of light transmissive beads 14 are arranged in a single layer array on the surface 19 of the absorbing binder to then penetrate the plurality of light transmissive beads 14 into the layer of absorbing binder 16 and through the thin layer 15 to the transparent layer 12. The opaque binder layer 16 is then activated into the set state for supporting the light transmissive beads 14 in position with the transmission apertures 34 of the beads 14 in contact with the asymmetrical diffusing layer 12. A layer of light transmissive material 128 in the unset state is disposed on protruding surfaces 36 of the beads 14, pressure is applied to the layer of light transmissive material 128 to substantially conform the layer to the shapes of protruding portions of the beads 14 and laminate the conformal layer to the beads 14 and the absorbing binder 19. The layer of light transmissive material 128 is activated into the set state in a conventional manner for binding the layer 128 to the beads 14. Layering the absorbing layer 16 and thin transparent layer 15 as illustrated and described herein assures that portions of the incident surfaces 36 of the beads 14 protrude from the absorbing binder. The deformable semi-viscous state of the light transmissive layer beneficially allows it to conform to the shapes of these protruding portions of the beads 14 and retain the shape of defined lenses 131 with centers of curvature forward of the centers of curvature of the beads 14. Radii of curvature of these lenses 131 can also be adjusted in this manner. This process may result in a non-uniform thickness in the layer 128 measured normally to the incident surfaces 36 of the beads 14. Alternatively, a small quantity of light transmissive material may be centrally deposited on upper crests of the protruding beads 14 prior to depositing the layer 128 of light transmissive material in the unset state on protruding incident surfaces 36 of the beads 14. The combined volumes of transparent materials on the incident surfaces 36 of the beads 14 migrate together under heat and/or pressure to form the diffusion lenses as previously described on the incident surfaces 36 of each bead 14.

Figure 9:
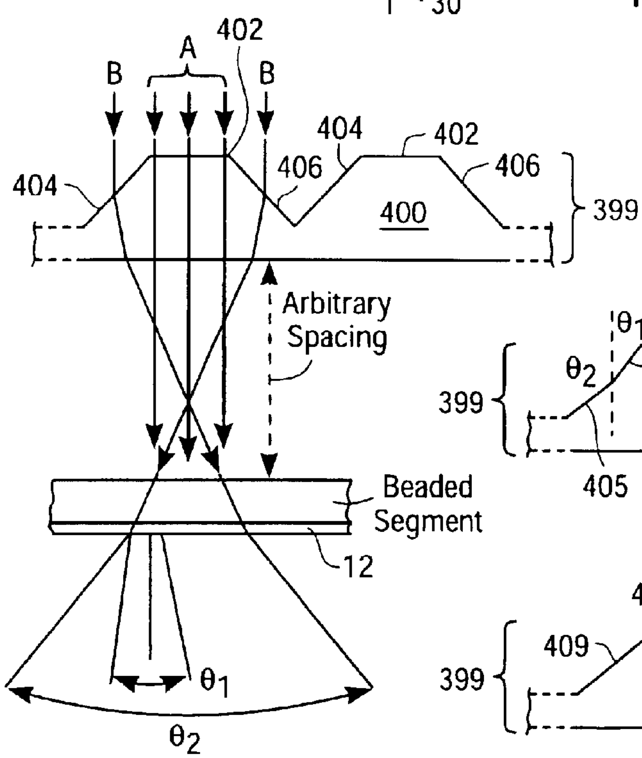
FIG. 9 is a sectional view of another embodiment of the present invention, showing a structure that can be used to enhance the gain along one axis relative to another orthogonal axis.

In another embodiment of the present invention, the asymmetrical gain of the filter may be enhanced along one axis relative to another orthogonal axis using a structure as partially illustrated in FIG. 9. Specifically, the sectional view of the filter illustrated in this figure (i.e., as a top sectional view) shows a layer 399 of prismatic 'lenses' 400 having planar or plateau faces 402 and faceted or angular sloped faces 404, 406 in iterative, contiguous orientations along, for example, the horizontal axis of the filter. In this embodiment, the layer 399 of prismatic 'lenses' is disposed to receive incident collimated light rays A, B from a light source (not shown). Rays A impinging upon the plateau faces 402 are transmitted through the layer without deviation, and the dispersion of light via the successive segments of the filter including a beaded layer proceeds as previously described. However, collimated light rays B impinging upon the sloped faces 404, 406 are deviated from the incident orientation to provide additional dispersion through the successive segments of the filter including a beaded layer as previously described, with resultant wider viewing angle $\theta_2$ along the horizontal axis. The horizontal angle may be adjusted by changing the size of the plateau faces 402 and the angles of the sloping faces 404, 406. It should be noted that enhanced viewing angle, for example, along the horizontal axis may be so enhanced with the prismatic layer 399 disposed before or after a beaded segment of the filter, and with the prismatic surfaces 402, 404, 406 facing in either direction relative to the axis of incident light. Also, the spacing shown between the prismatic layer 399 and beaded segment of filter on support layer 12 is illustrative only, and such spacing may be zero for a contiguous, layered structure.

Thus, a flat-surface filter structure may be achieved that is conducive to receiving anti-reflective coatings, and the like, using a prismatic layer 399 at the incident or input side of the filter with the prismatic surfaces oriented inwardly. A support layer of the transparent material may be disposed at the output side of the filter, with beaded segments according to previously-described embodiments interposed between such input and output surfaces. Alternatively, the prismatic layer 399 may also be disposed to receive light ou tput from a beaded segment as previously described, with the sloping faces oriented toward the direction of light output or toward the incident light.

Figure 10:
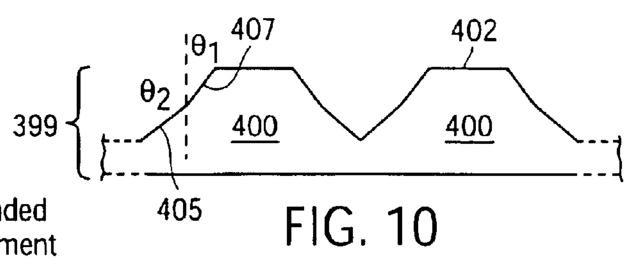
FIG. 10 and FIG. 11 are sectional views of prismatic lenses fabricated as microgrooves.
Figure 11:
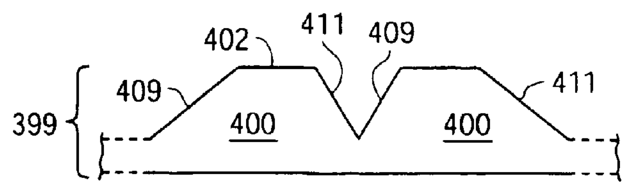

Variations of the prismatic layer 399 in accordance with alternative embodiments of the present invention are illustrated in the top sectional views of FIGS. 10 and 11 in which different angles of sloping surfaces may be used to provide enhanced viewing angles along the horizontal axis. Specifically, as shown in the top sectional view of FIG. 10, a sloping surface may be formed of two or more surfaces or facets 405, 407 that are disposed at different angles. Alternatively, as illustrated in the topsectional view of FIG. 11, the prismatic lenses 400 may be asymmetrical about the plateau faces 402, with sloping faces 409, 411 at different slope angles on opposite sides of the plateau faces 402.

The various configurations of prismatic lenses, for example, as illustrated in FIGS. 9–11 may be fabricated as microgrooves that are cut or otherwise formed in thermoplastic transparent sheet material, for example, as by embossing with a master platen of the inverse image that is heated and pressed into the surface of the thermoplastic sheet. Typical microgrooves form plateaus 400 of about 50 microns at the base.

Therefore, asymmetrical viewing angles may be established using filter structures according to the present invention which promote a larger viewing angle along one axis (e.g., the horizontal axis) in comparison with the viewing angle along an orthogonal (e.g. vertical) viewing axis.

What is claimed is:

1. A light filter comprising:

a first layer of substantially opaque material including front and back surfaces;

a plurality of light transmissive beads disposed in a single-layer array within the first layer of opaque material with first portions of the beads penetrating through the front surface of the first layer of opaque material to form light transmissive apertures and remaining portions of the beads protruding through the back surface of and not disposed within the first layer of substantially opaque material to receive incident light; and a second layer of light-dispersing material having asymmetrical dispersion characteristics along orthogonal axes, the second layer being interposed between incident light and the remaining portion of the beads protruding through the back surface of and not disposed within the first layer of substantially opaque material to disperse light incident on the second layer to enhance light transmission along one of the orthogonal axes relative to light transmission along another of the orthogonal axes, the second layer including within a material for scattering incident light.

2. The light filter according to claim 1 including a conformal layer of transmissive material affixed to the back surface of the first layer and the remaining portions of the beads to receive incident light.

3. The light filter according to claim 2 in which the beads have a radius R, and the thickness of the conformal layer is not greater than R.

4. The light filter according to claim 3 in which the thickness of the conformal layer is about ten percent (10%) of R.

5. The light filter according to claim 1 further comprising a support layer of transparent material disposed on the front surface of the first layer.

6. The light filter according to claim 5 wherein the support layer of transparent material has asymmetrical dispersion characteristics along orthogonal axes.

7. The light filter according to claim 1 further comprising a thin transparent layer disposed between the first layer and the second layer, the beads penetrating the first layer and the thin transparent layer to form apertures of increased diameter.

* * * * *

UNITED STATES PATENT AND TRADEMARK OFFICE

CERTIFICATE OF CORRECTION

PATENT NO. : 6,939,014 B1

DATED : September 6, 2005

INVENTOR(S) : Dennis W. Vance and Charles Robert Wolfe

It is certified that error appears in the above-identified patent and that said Letters Patent is hereby corrected as shown below:

Title page, Item [54] and Column 1, line 1,
Title, replace "LIQUID" with -- LIGHT --.

Signed and Sealed this

Twenty-seventh Day of December, 2005

JON W. DUDAS
*Director of the United States Patent and Trademark Office*